US006349219B1

(12) United States Patent
Hochwald et al.

(10) Patent No.: US 6,349,219 B1
(45) Date of Patent: Feb. 19, 2002

(54) ANTENNA ARRAY HAVING REDUCED SENSITIVITY TO FREQUENCY-SHIFT EFFECTS

(75) Inventors: Bertrand M. Hochwald; Thomas Louis Marzetta, both of Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/260,363

(22) Filed: Mar. 1, 1999

(51) Int. Cl.[7] .................................................. H04B 7/00

(52) U.S. Cl. ....................... 455/562; 455/272; 342/368; 342/372; 343/844

(58) Field of Search ................................ 342/398, 371, 342/372, 368, 154, 157; 455/73, 82, 13.3, 19, 129, 562, 272; 343/702, 722, 844

(56) References Cited

U.S. PATENT DOCUMENTS

| | | | | |
|---|---|---|---|---|
| 5,162,809 A | * 11/1992 | Wu | ............................ | 343/909 |
| 5,497,169 A | * 3/1996 | Wu | ............................ | 343/909 |
| 5,675,343 A | * 10/1997 | Champeau | .................. | 342/378 |

OTHER PUBLICATIONS

G.C. Raleigh and V.K. Jones, "Adaptive antenna transmission for frequency duplex digital wireless communication," *Proc. IEEE Int. Conf. Comm.*, pp. 641–646, (1997).

* cited by examiner

*Primary Examiner*—Dwayne Bost
*Assistant Examiner*—Miguel D. Green
(74) *Attorney, Agent, or Firm*—Martin I. Finston

(57) ABSTRACT

In a system for sending wireless communication signals on at least one downlink wavelength and receiving wireless communication signals on at least one uplink wavelength, there is a ratio r equal to the larger divided by the smaller of these wavelengths. The system comprises a receiver operative to receive signals imposed on a carrier having the uplink wavelength, a transmitter operative to transmit signals imposed on a carrier having the downlink wavelength, and an array of independent antenna elements. The array comprises a first and a second sub-array. One sub-array is electrically coupled to the transmitter, such that transmitted signals can be radiated from it, and the other sub-array is electrically coupled to the receiver, such that signals to be received can be extracted from it. The sub-arrays are geometrically similar to each other with a relative scale factor equal to the wavelength ratio r. The sub-arrays have at least one common antenna element.

8 Claims, 3 Drawing Sheets

ANTENNA ARRAY HAVING REDUCED SENSITIVITY TO FREQUENCY-SHIFT EFFECTS

FIELD OF THE INVENTION

This invention relates to antenna arrays, and more particularly, to antenna arrays used for uplink and downlink communication in cellular and other wireless communication systems.

BACKGROUND OF THE INVENTION

Every antenna has a directionally-dependent response function, which is often referred to as the "radiation pattern" in transmission, and as the "sensitivity pattern" in reception. It has long been known that when multiple antenna elements are assembled in an antenna array, the shape of this response function can be tailored by applying suitable complex-valued weights (which combine specified phase delays with specified attenuation coefficients) to the respective elements. One particular known advantage of such arrays is that by actively changing the weight coefficients, it is possible to maximize the transmitted or received power in a specified direction. An antenna array effective for that purpose is one example of an adaptive array.

In the field of cellular communications, it is an ideal, but generally unreachable, goal for each base station to transmit power only to mobile stations within a designated reception area, and to be sensitive to transmissions only from those mobile stations. One proposed approach to this goal is for the base station to transmit and receive using an adaptive array that seeks to maximize its response function at the mobile stations within its reception area.

For example, during uplink transmission from a given mobile station, it is possible for each element of the array to measure a respective propagation coefficient characterizing the physical channel between itself and that mobile station. This coefficient is desirably sampled over time. In TDMA systems, for example, the propagation coefficient from each mobile station, in turn, can be sampled in each of the, e.g., 162 symbol periods that occupy that mobile station's time slot. The time-averaged samples can be assembled into a covariance matrix for each mobile station. Recently, a technique has been described for obtaining, from each of these covariance matrices, a set of weight coefficients that will tend to concentrate the response function in the direction of the pertinent mobile station. This technique is described, e.g., in G. G. Raleigh et al., "Adaptive Antenna Transmission for Frequency Duplex Digital Wireless Communication," *Proc. Int. Conf. Comm.,* Montreal, Canada (June 1997).

However, there are certain obstacles to putting this scheme into successful practice. Measures are necessary to prevent interference between the uplink and downlink signals. The most common such measure, at least in TDMA systems, is referred to as frequency-division duplex transmission (FDD). In FDD there is a shift, typically 5%–10%, between the uplink and downlink carrier frequencies (or, equivalently, between the corresponding wavelengths). This shift is sufficient for the receivers at the base station and mobile stations to readily distinguish between the uplink and downlink signals. Thus, it is possible for uplink and downlink transmissions to overlap in time. (Although there are also time-division duplex systems, in which such overlap is forbidden, the use of these systems is less favored.)

The response function of an antenna array is dependent upon the frequency of transmission or reception. Therefore, in a FDD system, the uplink sensitivity pattern is different from the downlink radiation pattern. A set of weight coefficients derived adaptively on the uplink to provide a certain directionality will not, in general, provide the same directionality on the downlink.

There are known formulas for deriving a new set of coefficients, effective for the downlink wavelength, from the uplink weight coefficients. However, these formulas generally require the direction to the targeted mobile station to be known with more precision than is available from the covariance matrices alone. The operations required to provide such directional information are complex and time-consuming, and for that reason are disfavored.

Because of the obstacles described above, it is desirable to provide the base station with a system of antennas that can obtain statistical information concerning the uplink propagation coefficients, and then obtain weights from this statistical information for use on the downlink.

One proposed approach is for such a system to consist of two distinct antenna arrays, one for the uplink, and the other for the downlink. It is known that two antenna arrays, operating at distinct frequencies (and thus, distinct wavelengths), will have identical response functions if they are identical except for scale, and if their relative scale factor is equal to the ratio of the respective wavelengths. That is, let the spacing between each pair of elements of array 2 be r times the spacing of the corresponding elements of array 1. Let array 1 operate at wavelength $\lambda_1$, and let array 2 operate at wavelength $\lambda_2$.

Then the arrays will have the same response function if $$r = \frac{\lambda_2}{\lambda_1}.$$

Thus, one wavelength can be taken as the uplink wavelength, and the other as the downlink wavelength. Distinct uplink and downlink antenna arrays can be installed, geometrically similar but having relative scales determined by the wavelength ratio.

However, such an approach has certain disadvantages. One disadvantage is the expense of a second antenna installation. Another disadvantage relates to the relative siting of the respective antenna arrays. If the arrays are sited too close to each other, they will suffer undesirable mutual coupling effects. If, on the other hand, they are sited too far from each other, the weights selected from the uplink measurements may not function properly on the downlink, at least for relatively close mobile stations.

Therefore, there continues to be a need, in the cellular wireless field as well as other fields in which uplink and downlink antenna arrays can utilize directionality, for a practical system of antennas whose response function is insensitive to wavelength shifts.

SUMMARY OF THE INVENTION

We have invented an antenna array having a response function that is insensitive to shifts between pairs of wavelengths that stand in a specified ratio.

In a broad aspect, our invention involves a system for sending wireless communication signals on at least one downlink wavelength and receiving wireless communication signals on at least one uplink wavelength, wherein there is a ratio r equal to the larger divided by the smaller of these wavelengths. The system comprises a receiver operative to receive signals imposed on a carrier having the uplink wavelength, a transmitter operative to transmit signals imposed on a carrier having the downlink wavelength, and an array of independent antenna elements. (By "independent" is meant that these elements can be separately driven, or separately used for the reception of radiofrequency signals.)

The array comprises a first and a second sub-array. One sub-array is electrically coupled to the transmitter, such that transmitted signals can be radiated from it, and the other sub-array is electrically coupled to the receiver, such that signals to be received can be extracted from it.

The sub-arrays are geometrically similar to each other; i.e., each antenna element of one array has a counterpart in the other sub-array, and corresponding inter-element spacings stand in a constant ratio. Thus, the constant ratio is a scale factor that relates the dimensions of one sub-array to the dimensions of the other. This scale factor is equal to the wavelength ratio r.

Significantly, the sub-arrays have at least one common antenna element.

In specific embodiments, the elements of the full array are arranged in a one-, two- or three-dimensional array having, respectively, one, two, or three lattice directions. At least three elements, and not more than a respective maximum number of elements, are arranged from first to last along each lattice direction of the array. Along each lattice direction, the elements are spaced with a constant ratio between successive spacings.

The array comprises first and second sub-arrays. Along each lattice direction, there is at least one row in which the first M−1 elements belong to the first sub-array, and the last M−1 elements belong to the second sub-array, where M is the respective maximum number of elements along that lattice direction.

DETAILED DESCRIPTION

Figure 1:
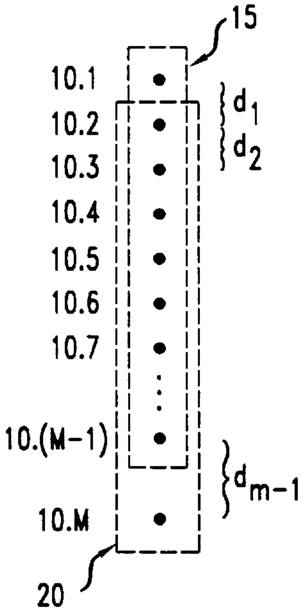
FIG. 1 is a schematic diagram of a linear antenna array in accordance with the invention in one embodiment.

Turning to FIG. 1, an illustrative linear antenna array according to the invention has M antenna elements 10.1, 10.2, . . . , 10.M. The spacing between the m'th and the (m+1)'th of these elements is denoted $d_m$, m=1, 2, . . . , M−1. For illustrative purposes, and not for limitation, the elements are here numbered such that $d_m$ increases for increasing m.

Each spacing is a constant multiple of the previous spacing; that is, $$\frac{d_m}{d_{m-1}}$$

is a constant, for m=2, 3, . . . , M−1.

One of two wavelengths $\lambda_1$, $\lambda_2$ is used for receiving signals (e.g., for the uplink in a wireless communication system), and the other is used for transmitting signals (e.g., for the downlink in a wireless communication system). The ratio $$\frac{d_m}{d_{m-1}}$$

(using the illustrative convention for numbering the antenna elements) is equal to the ratio of the longer of these wavelengths to the shorter. For the function (i.e., transmission or reception) that takes place on the shorter wavelength, elements 1 through M−1 are used. For the function that takes place on the longer wavelength, elements 2 through M are used.

Thus, for example, an antenna array for a wireless communication system may use an uplink wavelength $\lambda_1$ which is 10% longer than downlink wavelength $\lambda_2$. In such a case, each inter-element spacing after the first will be 1.1 times the preceding spacing. The first M−1 elements will comprise the downlink sub-array (shown in FIG. 1 as sub-array 15), and the last M−1 elements will comprises the uplink sub-array (shown in the figure as sub-array 20).

The overall size of the full (i.e., uplink plus downlink) antenna array will be determined by the number of elements and the first inter-element spacing d . The spacing d should not be so small that there is undesirable coupling between antenna elements. On the other hand, if this spacing is made too large, desired directionalities in the response function of the antenna array will be degraded.

A currently preferred spacing d is about one-half the shorter of the two operating wavelengths. Departures from such half-wavelength spacing may be permissible in accordance with known techniques of antenna design. In practice, at least a modest range of wavelengths will generally be available for transmission and reception, provided only that each pair of uplink and downlink wavelengths should stand in substantially the same ratio.

It should be noted in this regard that as the inter-element spacing increases, directional ambiguity in the response function also tends to increase. Thus, in particular, relatively large spacings will be acceptable for applications where directional ambiguity can be tolerated.

According to our current belief, as few as three elements (in a linear array) will provide useful benefits. Typically, practical considerations will limit the size of the largest acceptable array. For example, because the length of the array grows exponentially with the number of elements, there will be some number of elements for which the cost of installation is prohibitive.

It should be noted in this regard that our antenna array will generally work best in communication with terminals (exemplarily, mobile stations) situated in the far field, although it is not limited to far-field operation. A terminal is considered to lie in the far field if its distance from the antenna array is greater than $$\frac{L^2}{\lambda},$$

where L is the length of the array, and λ is the operating (uplink or downlink) wavelength. Thus, if optimum performance is desired in communication with terminals situated a relatively short distance away, it may be desirable to limit the length of the array in such a way that those terminals are excluded from the near field, and included in the far field.

It should also be noted that, strictly speaking, the uplink and downlink sub-arrays will have the same response function only if each of the antenna elements, individually, has an omnidirectional response function. Otherwise, the response function of the array will be (spatially) modulated by the element response function, which may be different for the two operating wavelengths.

In fact, there are some applications, exemplarily in the field of cellular communications, in which it is desirable to confine the response function of the antenna array to prescribed sectors, such as 30° or 60° sectors. In at least some such cases, it will be advantageous to use individually directional antenna elements. Moreover, the use of an initial spacing d that is greater than a half-wavelength may be advantageous in at least some such applications.

Figure 2:
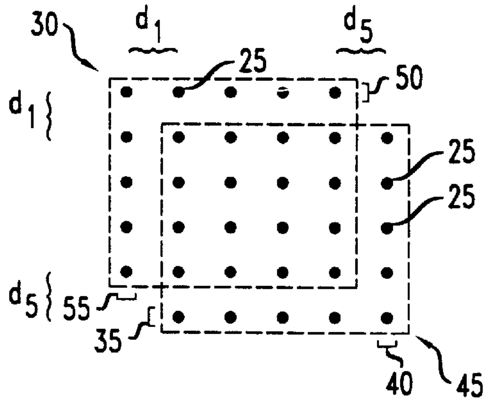
FIG. 2 is a schematic diagram of an illustrative two-dimensional antenna array in accordance with the invention in an alternate embodiment.

It will be appreciated that the principles described above in regard to a linear array are readily generalized to an antenna array of two, or even of three, dimensions. For example, FIG. 2 shows an illustrative two-dimensional array of 34 elements. For purposes of illustration, the elements 25 of this array are assumed to be numbered from left to right, and from top to bottom.

The array shown in the figure has mutually perpendicular lattice directions lying along respective horizontal and vertical axes. The same initial inter-element spacing d is used in both lattice directions. The maximum number M of elements along each lattice direction of the array shown in the figure is six.

More generally, the lattice directions may form an angle other than 90°; for example, the antenna elements may form a hexagonal lattice, in which there is an angle of 60° between the lattice directions. Moreover, the initial spacing d may differ in different lattice directions. Still further, the maximum number of elements along one lattice direction need not equal the maximum number of elements along a different lattice direction. However, the same ratio r between successive inter-element spacings should be applied in all lattice directions.

With further reference to FIG. 2, it is evident that a sub-array 30 for operating at the shorter wavelength is obtained by taking the first M−1 (i.e., the first 5, in the example shown) elements along each lattice direction. In the example shown, the result is to exclude from sub-array 30 the last row 35 of elements and the last column 40 of elements. Similarly, a sub-array 45 for operating at the longer wavelength is obtained by taking the last M−1 elements along each lattice direction. In the example shown, the result is to exclude from sub-array 45 the first row 50 of elements, and the first column 55 of elements. In the example shown, neither sub-array would include an element situated at the intersection of the first row and last column, or at the intersection of the last row and first column. Such an element would be redundant, and could be omitted entirely from the full array, as shown in the figure.

Figure 3:
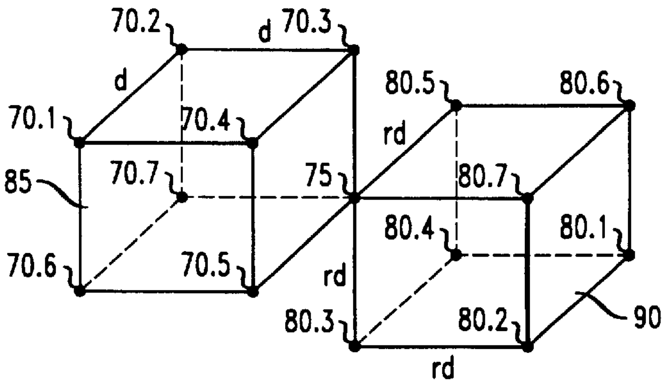
FIG. 3 is a schematic diagram of an illustrative three-dimensional antenna array in accordance with the invention in an alternate embodiment.

FIG. 3 depicts an illustrative three-dimensional array. For simplicity of presentation, the number of elements in the depicted array is limited to 15. The principles of array design illustrated here are, however, readily applied to the design of arrays having greater numbers of elements.

For purposes of illustration, the array of FIG. 3 has a rectangular parallelepipedal lattice structure with the same initial spacing d in all three lattice directions. The first antenna element of the array is element 70.1.

First sub-array 85 is a cube of edge length d, having antenna elements at corners 70.1–70.7 and 75. Second sub-array 90, is a cube of edge length rd, having antenna elements at corners 75 and 80.1–80.7. Corner 75 is common to both sub-arrays. It should be noted that in arrays of this general conformation having greater numbers of elements, the region common to both sub-arrays will typically be a rectangular parallelepipedal array of antenna elements.

Figure 4:
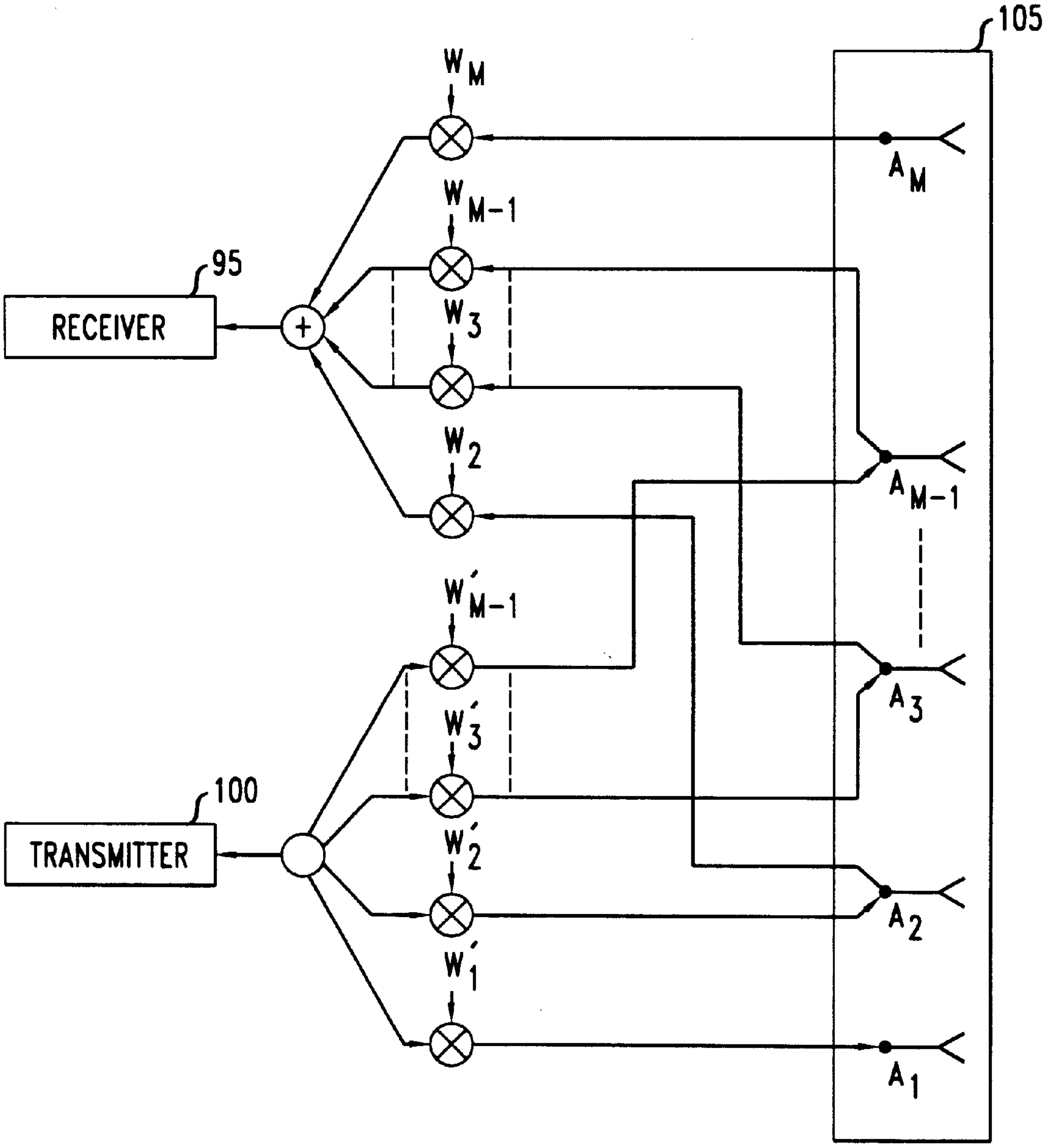
FIG. 4 is a partial, schematic block diagram of an illustrative central station, such as a cellular base station, including a linear antenna array in accordance with the invention in one embodiment.

FIG. 4 depicts an illustrative central station, such as a cellular base station, that includes receiver 95, transmitter 100, and log-periodic antenna array 105. As shown, the uplink (i.e., the receiving) sub-array consists of antenna elements $A_2$–$A_M$. The output of each of these elements is input to receiver 95 for detection at the pertinent one of the two wavelengths, demodulation, and further processing. Typically, a respective complex weight coefficient multiplies the output from each antenna element. In the figure, the outputs of antenna elements $A_2$–$A_M$ are shown multiplied by respective weight coefficients $W_2$–$W_M$ outside of receiver 95. In practice, this operation is often included among the various operations performed by the receiver, and thus within block 95.

As shown in FIG. 4, the downlink (i.e., the transmitting) sub-array consists of antenna elements $A_1$–$A_{M-1}$. The input to each of these elements is derived from transmitter 100, which directs a modulated carrier signal at the pertinent one of the two wavelengths to the respective elements. Typically, a respective complex weight coefficient multiplies the input to each antenna element. In the figure, the inputs to antenna elements $A_1$–$A_{M-1}$, are shown multiplied by respective weight coefficients $W'_1$–$W'_{M-1}$ outside of transmitter 100. In practice, this operation is often included among the various operations performed by the transmitter, and thus within block 100.

The illustrative embodiments of the invention described above are based on the simple case of a linear array with inter-element spacings increasing in one direction, and on generalizations of that case to two and to three dimensions. We will now describe illustrative embodiments that relate to a broader aspect of our invention.

Figure 5:
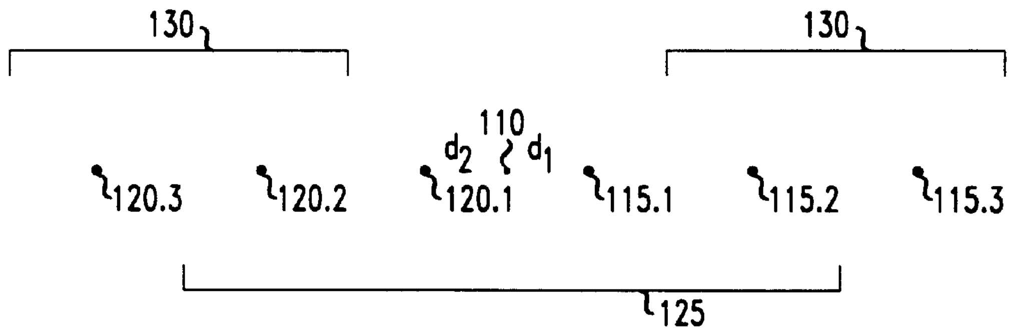
FIG. 5 is a schematic diagram of an alternative linear array, in accordance with the invention, in which the direction of increase of the inter-element spacings is opposite for opposite ends of the array.

FIG. 5 depicts a linear array in which the direction of increase of the inter-element spacings is opposite for opposite ends of the array. Measuring from origin 110, antenna elements 115.1, 115.2, and 115.3 are situated at respective distances $d_1$, $rd_1$, and $r^2d_1$. Similarly, antenna elements 120.1, 120.2, and 120.3 are situated at respective distances $d_2$, $rd_2$, and $r^2d_2$. It will be appreciated that the separations between successive, oppositely situated pairs of elements change by successive factors of r; that is, the distance between elements 115.3 and 120.3 is r times that between elements 115.2 and 120.2. The last-stated distance is r times the distance between elements 115.1 and 120.1.

Sub-array 125 contains elements 115.1, 115.2, 120.1, and 120.2. Sub-array 130, which, as shown in the figure, has two separated parts, contains elements 115.2, 115.3, 120.2, and 120.3.

Sub-array 130 is geometrically similar to sub-array 125, and it is scaled relative to sub-array 125 by a factor of r. For example, the separation between the inner two elements 115.2 and 120.2 of sub-array 130 is $r(d_1+d_2)$, whereas the separation between the corresponding elements 115.1 and 120.1 of sub-array 125 is ($d_1+d_2$). The elements common to both sub-arrays are elements 115.2 and 120.2.

The array of FIG. 5 is readily extended by adding pairs of elements, one to each end, with spacings dictated by the rule for scaling by r.

Figure 6:
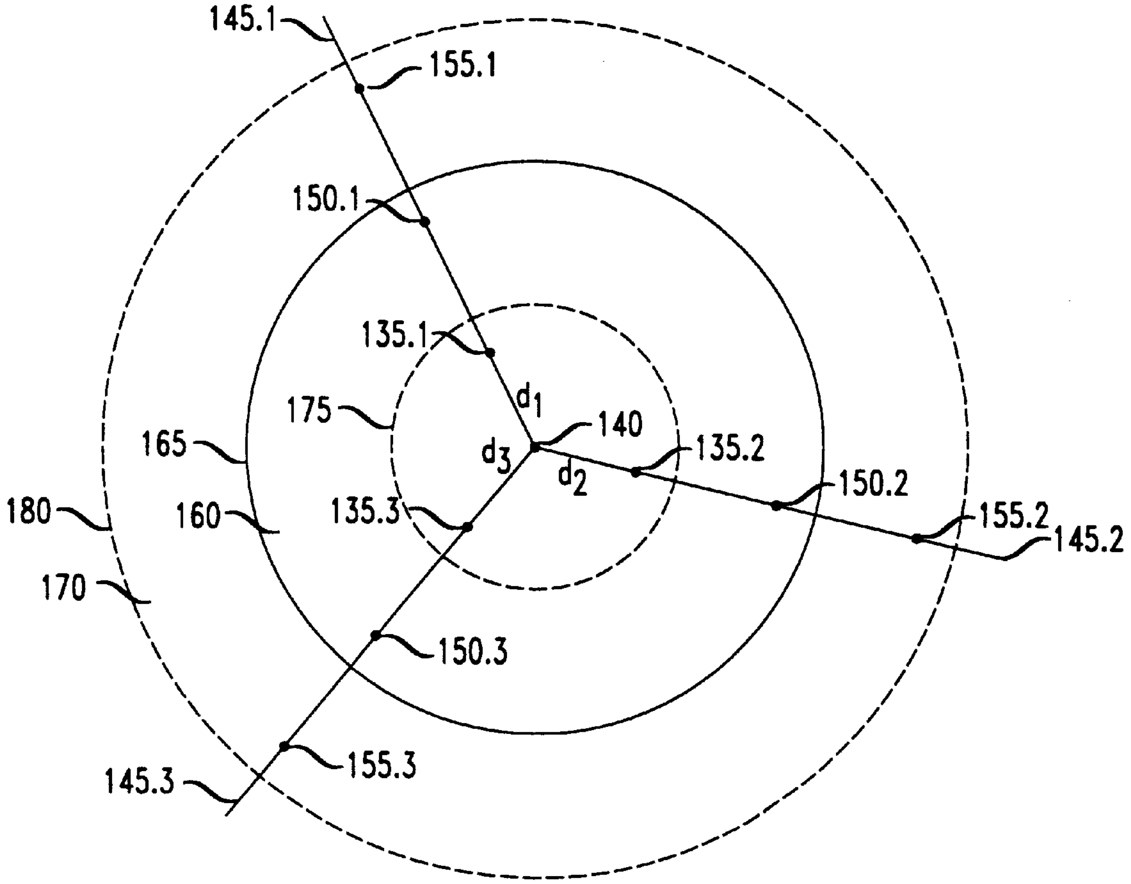
FIG. 6 is a schematic diagram of an alternative two-dimensional array, according to the invention, in which the antenna elements are arranged on three spokes emanating from a common origin.

FIG. 6 depicts a generalization of the array of FIG. 5 to two dimensions. The example shown is a Y-shaped array whose conformation is determined by scale factor r and the distribution of initial elements 135.1, 135.2, and 135.3 about origin 140.

The intial elements lie at respective distances $d_1$, $d_2$, $d_3$ from the origin. Together with the origin, the location of each of the initial elements defines a respective axis 145.1, 145.2, 145.3. The next layer of elements 150.1, 150.2, 150.3 lie distant from the origin, on their respective axes 145.1–145.3, by $rd_1$, $rd_2$, and $rd_3$, respectively. Similarly, the elements 155.1, 155.2, 155.3 of the next layer lie at respective distances $r^2d_1$, $r^2d_2$, $r^2d_3$.

Sub-array 160, shown in the figure as enclosed by boundary 165, contains elements 135.1–135.3 and elements 150.1–150.3. Sub-array 170, shown in the figure as lying between boundaries 175 and 180, contains elements 150.1–150.3 and 155.1–155.3. The elements common to both subarrays are elements 150.1–150.3.

The basic scaling rule for the array of FIG. 6 is to begin with an arbitrary distribution of initial elements about the origin, and to add successive layers of elements along the respective axes defined by the origin and the initial elements, such that each new element along a given axis is distant from the origin by r times its predecessor's distance from the origin. This rule is applicable to any initial distribution of elements in one, two, or three dimensions.

What is claimed is:

1. A system for sending wireless communication signals on at least one downlink wavelength and receiving wireless communication signals on at least one uplink wavelength, wherein there is a ratio r equal to the larger divided by the smaller of said wavelengths, the system comprising:

a receiver operative to receive signals imposed on a carrier having the uplink wavelength;

a transmitter operative to transmit signals imposed on a carrier having the downlink wavelength; and an array of independent antenna elements, wherein:

the array comprises a first sub-array and a second sub-array;

one sub-array is electrically coupled to the transmitter, such that transmitted signals can be radiated therefrom;

the other sub-array is electrically coupled to the receiver, such that signals to be received can be extracted therefrom;

the sub-arrays are geometrically similar to each other such that they differ in corresponding inter-element spacings by a scale factor equal to r; and the sub-arrays have at least one common antenna element.

2. The system of claim 1, wherein:

the array comprises an arrangement of antenna elements in one, two, or three dimensions, and the array has, respectively, one, two, or three lattice directions;

at least three elements are arranged from first to last along each lattice direction;

a maximum number M of elements is arranged along each lattice direction, M having a respective value for each lattice direction;

along each lattice direction, the elements are spaced with a constant ratio between successive spacings, said ratio equal to r; and along each lattice direction, there is at least one row in which the first M−1 elements belong to the first sub-array, and the last M−1 elements belong to the second sub-array, M having the respective value for that lattice direction.

3. The system of claim 2, wherein the array is a linear array.

4. The system of claim 2, wherein the array is a two-dimensional array.

5. The system of claim 4, wherein the array is conformed as a central rectangular array common to the first and second sub-arrays, plus a first row and first column belonging only to the first sub-array, and a last row and last column belonging only to the second sub-array, each of said first and last rows and columns containing at least one antenna element.

6. The system of claim 2, wherein the array is a three-dimensional array.

7. The system of claim 6, wherein the array is conformed as a pair of intersecting rectangular parallelepipeds.

8. A method of wireless communication using an array of antenna elements, the method comprising receiving signals on an uplink wavelength from an uplink subset of the antenna elements, and transmitting signals on a downlink wavelength from a downlink subset of the antenna elements such that at least one, but not all, of the antenna elements is used for both reception and transmission, wherein:

there is a ratio r equal to the larger divided by the smaller of the uplink and downlink wavelengths; and the uplink subset and the downlink subset form respective sub-arrays that are geometrically similar to each other such that they differ in corresponding inter-element spacings by a scale factor equal to r.

* * * * *